Dec. 23, 1941.  G. A. TINNERMAN  2,266,832

FASTENING DEVICE

Original Filed July 31, 1936

INVENTOR.
GEORGE A. TINNERMAN
BY Bates, Goldrick, & Teare
ATTORNEYS

Patented Dec. 23, 1941

2,266,832

UNITED STATES PATENT OFFICE 2,266,832

FASTENING DEVICE

George A. Tinnerman, Rocky River, Ohio, assignor, by mesne assignments, to Tinnerman Products, Inc., Cleveland, Ohio, a corporation of Ohio Original application July 31, 1936, Serial No. 93,679, now Patent No. 2,159,573, dated May 23, 1939. Divided and this application February 23, 1939, Serial No. 257,900.

3 Claims. (Cl. 85—32)

This invention relates to fastening devices and particularly to a device for holding a nut firmly in position for receiving a threaded bolt. There are many instances, especially in blind locations, where a standard nut is desired, but where the operator either cannot hold it in place while the bolt is being inserted, or cannot thereafter hold it against rotation during the final tightening operation. The present application is a division of my copending application, Serial No. 93,679, filed July 31, 1936, now Patent No. 2,159,573, issued May 23, 1939.

An effort has been made to retain a nut in bolt receiving position by welding it to one of the parts, but such method is expensive, and is objectionable in that the nut cannot be moved a slight distance to compensate for misalignment of the openings in the two parts that are to be connected together.

An object of the present invention is to make a fastener which can be readily attached to one of the parts to be joined, and which will be so formed that it will hold the nut firmly in bolt receiving position. The attachment may take any one of several different forms, but in each case it comprises a clip which is frictionally held by spring tension onto one of the parts, and in each case, has provision thereon for holding a nut against rotation.

A more specific object of my present invention is the provision of a preformed hook or snap carrier for a nut, which can be pressed or snapped into an aperture in the supporting member to be joined, to thereby provide self-retaining means for supporting the nut in bolt receiving position.

Figure 1:
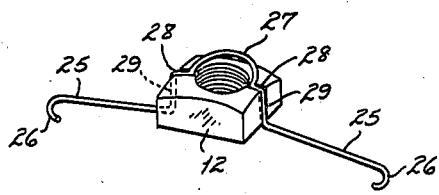
Figure 2:
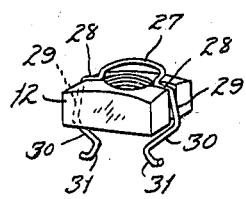
Figure 3:
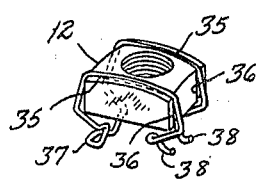

In the drawing, Figs. 1 to 3 are perspective views of different forms which the fastening device may have.

The form shown in Fig. 1 is made of wire instead of strip stock. The wire is bent to provide two arms 25, which extend outwardly from the nut, and which have article-engaging portions 26 that are bent downwardly adjacent the ends thereof. The mid-portion of the fastener is curved, as at 27, to clear the bolt opening in the nut and to engage the top face of the nut. Moreover, the portion between the curved part and each arm 25 is bent laterally, as at 28, and thence downwardly, as at 29 to engage grooves in the top and opposite side faces in the nut. The bent portions 28 and 29 are sufficiently close that they exert a yieldable pressure against the faces of the nut, so as to hold the nut in position solely by spring tension. The engaging portions 26 enable the fastener to be snapped over or pressed against the article under spring pressure, by means of which the fastener may be held in bolt-receiving position.

The form illustrated in Fig. 2 embodies a wire fastener, the mid-portion of which is bent, as at 27, to clear the bolt opening in the nut, in the same manner as the fastener shown in Fig. 1. Similarly, the fastener extends outwardly as at 28, and downwardly, as at 29, to engage slots in the top and side walls of the nut. Starting at the lower end of the portion 29, each arm of the fastener is bent downwardly and inwardly, as at 30, and thence outwardly, as at 31, to provide hook-shaped ends that are adapted to engage the walls of the bolt opening in an article. By this arrangement the nut is yieldably held in place over the aperture 32, under the influence of the pressure exerted by the portions 31.

The form illustrated in Fig. 3 is similar to that of Fig. 2 except for the fact that the wire fastener is shaped to engage parallel grooves 35 in the top face of the nut, and parallel grooves 36 in the opposite side faces of the nut. One piece of wire is used to form the entire fastener and it is so shaped that the intermediate portion 37 and the ends 38 provide the yieldable hooks which engage the walls of the bolt opening in the article, and thereby hold the nut in place under the influence of spring pressure.

From the foregoing description it will be apparent that I have devised a fastener that can be economically made and that will operate in a satisfactory manner to position a standard nut placed for receiving a threaded bolt. It will also be apparent that the fastener not only holds the nut in bolt receiving position, but also holds it against rotation during the tightening operation. The invention is further advantageous in that the fastener may be snapped or pressed into place on the supporting member and thus provide self-retaining means for supporting a nut in bolt receiving position.

I claim:

1. A nut-holding device comprising a strip of wire that is bent intermediately to engage opposite side and top faces of a nut and to partially encircle the bolt opening in the nut, the free ends of the arms being bent downwardly to engage an article.

2. A nut-holding device, comprising a strip of wire which is bent intermediately to engage opposite side and top faces of a nut, the mid-portion of the fastener being formed to clear the bolt opening in the nut, and the ends of the strip being bent inwardly and thence outwardly to provide yieldable article engaging portions.

3. A nut-holding device comprising a strip of wire having portions thereof shaped to engage along parallel lines the top and opposing vertical faces of a nut, and having inwardly extending hook-shaped portions which are adapted to engage the bolt opening in an article with which the nut is intended to be used.

GEORGE A. TINNERMAN.